United States Patent [19]

Gittens et al.

[11] Patent Number: 5,048,721
[45] Date of Patent: Sep. 17, 1991

[54] METHOD FOR ENHANCING THE MIXTURE OF GASES WITHIN A CYLINDER

[75] Inventors: Timothy E. Gittens, Piscataway, N.J.; Juergen D. Philipp, Mississauga, Canada

[73] Assignee: Union Carbide Industrial Gases Technology Corporation, Danbury, Conn.

[21] Appl. No.: 437,735

[22] Filed: Nov. 17, 1989

[51] Int. Cl.$^5$ .............................................. B67D 5/00
[52] U.S. Cl. ................................... 222/1; 141/9; 141/20; 222/3; 222/464
[58] Field of Search ............... 222/1, 3, 4, 195, 630, 222/459, 464; 141/46, 1, 2, 3, 4, 5, 9, 20

[56] References Cited

U.S. PATENT DOCUMENTS

| | | | |
|---|---|---|---|
| 2,400,955 | 5/1946 | Samel | 141/20 |
| 3,237,923 | 3/1966 | Turner | 141/20 |
| 4,461,657 | 7/1984 | Rana et al. | 148/36 |
| 4,578,113 | 3/1986 | Rana et al. | 75/124 |
| 4,611,641 | 9/1986 | Carter, Sr. | 141/9 |

OTHER PUBLICATIONS

Linde Turboblend Mixer, Union Carbide Industrial Gases Technology Corporation, 1989.

*Primary Examiner*—Kevin P. Shaver
*Attorney, Agent, or Firm*—Stanley Ktorides

[57] ABSTRACT

A gas cylinder having a valve on one end and an internal tube having at least one perforation. The tube extending from the valve through the majority of the length of the cylinder. A charging and a gas delivery method employing the perforated tube permits the gas or gases to be mixed.

9 Claims, 1 Drawing Sheet

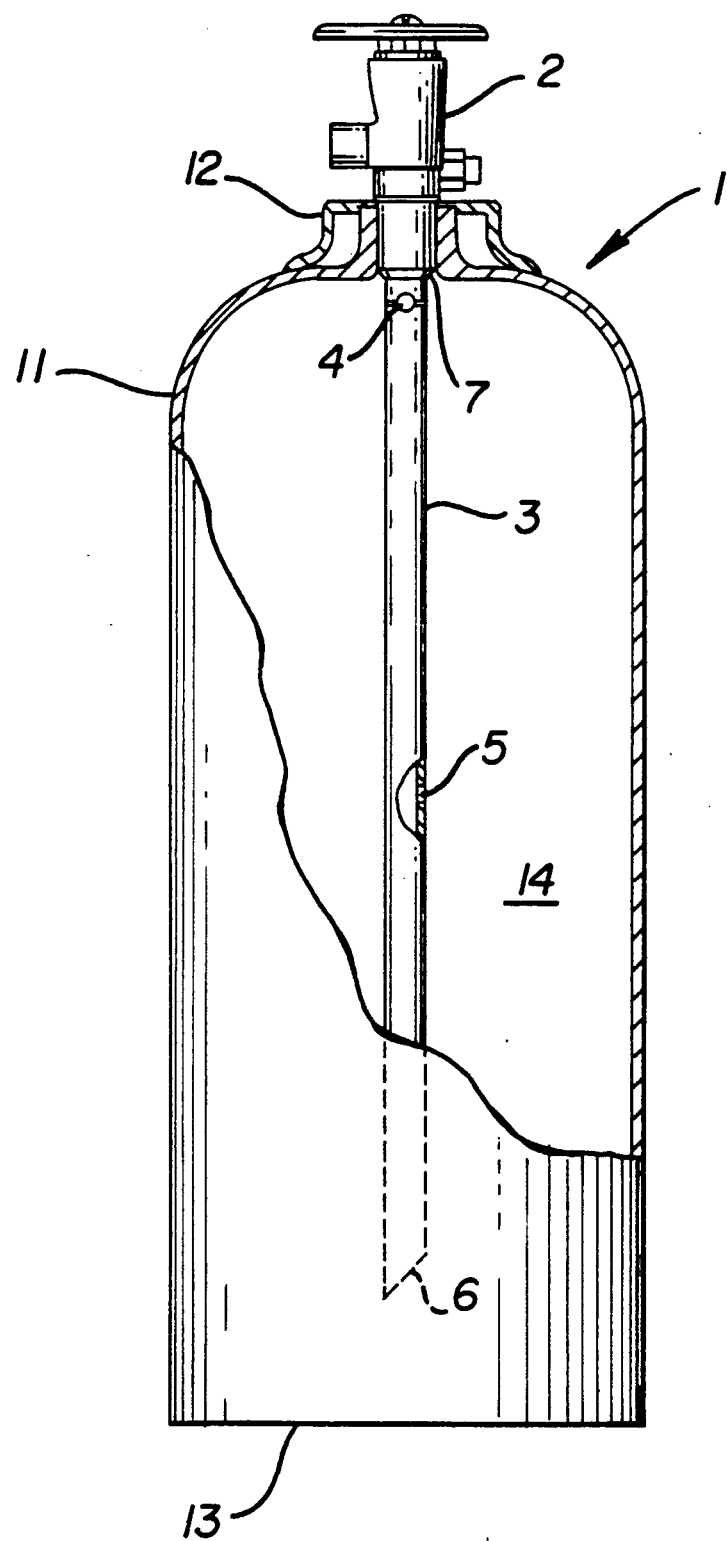

METHOD FOR ENHANCING THE MIXTURE OF GASES WITHIN A CYLINDER

TECHNICAL FIELD

This invention relates generally to containers, i.e cylinders, for the storage, transport or delivery of gas, and more particularly to the field of cylinders for use with gas mixtures.

BACKGROUND ART

Gas at high pressure is often stored, transported or delivered to a usage point in a cylinder. Cylinders generally have a cylindrical shape, i.e. a generally circular cross-section with one long axis perpendicular to the circular cross-section. Cylinders are often positioned with the long axis vertically oriented when they are used to store, transport or deliver gas.

A problem which arises when gas mixtures are used with cylinders is the stratification of individual components of the gas mixture, especially when the individual components have significantly differing densities. A cylinder is generally filled first with one component of the gas mixture and then with the second component. If the gas mixture has three or more components, each subsequent component is sequentially charged into the cylinder. The charging is generally carried out through a valve located at the neck or narrowed portion of the cylinder. The sequential charging of each gas mixture component to the cylinder contributes to an initial stratification of the individual gas mixture components. Furthermore, if the cylinder remains in a single position for a length of time, the stratification proceeds further as gas components of differing densities preferentially rise or fall within the cylinder.

The stratification is generally not complete; there is some of each component in all parts of the cylinder. The stratification, rather, results in the cylinder having a gas mixture richer in the lighter component or components in the upper portion of the cylinder than what the gas mixture specification calls for, and a gas mixture richer in the heavier component or components in the lower portion of the cylinder than what the gas mixture specification calls for. This stratification may cause significant quality and other problems because it causes a gas mixture to be delivered from the cylinder which deviates from the gas mixture specifications. This is a particular problem in certain applications such as in welding where even a small deviation from the shielding gas specification may have a significant impact on weld quality.

One method which has been used to address this gas mixture stratification problem is to roll or shake each cylinder prior to use. This procedure has met with limited success because it is time consuming and cumbersome, and moreover may be dangerous because of the cylinder weight and the high pressures at which the gas mixture is stored.

Furthermore if gas were to be injected into the cylinder through a tube from the valve, the tube would remain filled with the last to be charged component of the gas mixture. Thus, upon delivery of the gas mixture from the cylinder to a usage point, the first portion of gas delivered would not be the gas mixture but, rather, would be essentially pure gas component which remained in the tube. This problem could be addressed by bleeding off the first portion of the cylinder contents until this pure component in the tube is fully withdrawn. However, such bleeding off would result in some wastage.

A recent significant advance in the field of gas cylinders has been the cylinder described and claimed in U.S. Pat. No. 4,461,657—Rana et al. and U.S. Pat. No. 4,578,113—Rana et al. This new cylinder enables the use of much higher pressures for the gas within the cylinder. Thus significantly more gas can be put into a cylinder of a given size than was heretofore possible with conventional cylinders. This improves the efficiency of the gas transport and delivery operation.

However, in the case of gas mixtures, the new high pressure cylinder would exacerbate the problem of pure gas component in a tube because the tube would be filled with pure component at much high pressure, thus taking longer to clear the tube of pure component and begin delivery of the specified gas mixture. Accordingly, wastage would be increased serving to negate some of the advantage attainable with the high pressure cylinder.

Accordingly, it is an object of this invention to provide a cylinder for the containment of gas, and specifically gas mixtures, which will enable more efficient operation than is possible with heretofore available cylinders.

It is another object of this invention to provide a method for charging a gas cylinder which will enable more efficient operation than is possible with heretofore available gas cylinder charging methods.

It is a further object of this invention to provide a method for delivering gas from a gas cylinder which will enable more efficient operation than is possible with heretofore available gas delivery methods.

SUMMARY OF THE INVENTION

The above and other objects which will become apparent to those skilled in the art upon a reading of this disclosure are attained by the present invention, one aspect of which is:

A cylinder for containment of gas comprising:

(A) a cylinder shell;

(B) valve means through which gas may be passed into or out of the cylinder shell; and (C) a tube extending through the majority of the length of the cylinder shell, in flow communication with said valve means and with the cylinder shell interior, said tube having at least one perforation near the point of communication with said valve means, said perforation(s) enabling further flow communication between the cylinder shell interior and the tube.

Another aspect of this invention is:

A method for charging a cylinder comprising:

(A) providing a cylinder having a tube extending through the majority of its length;

(B) providing charging gas into and through said tube and passing said charging gas from said tube into the cylinder interior; and (C) drawing gas from the cylinder interior into the tube near the point where charging gas is provided into the tube and passing said drawn gas through the tube and into the cylinder interior.

A further aspect of this invention is:

A method for delivering gas from a cylinder comprising:

(A) providing a cylinder having a tube extending through the majority of its length;

(B) passing gas from the cylinder interior into and through the tube;

(C) drawing gas from the cylinder interior into the tube at a point remote from the point where gas is passed into the tube in step (B); and (D) delivering the gas passed into the tube in step (B) and drawn into the tube in step (C) out from the cylinder.

As used herein the term "cylinder" means any vessel for the containment of gas at pressure and is not intended to be limited to vessels having a cylindrical configuration.

As used herein the term "gas" means any fluid which acts to occupy the whole of any container within which it is put.

BRIEF DESCRIPTION OF THE DRAWING

The sole Figure is a cut away representation partly in cross-section of one preferred embodiment of the cylinder of this invention.

DETAILED DESCRIPTION

The invention may be used with any gas or gas mixture. The invention will find its greatest utility with a gas mixture in which the individual components of the gas mixture tend to stratify due to, for example, differences in density. A great variety of such gas mixtures exist, among which one can name mixtures of argon and carbon dioxide, mixtures of argon, carbon dioxide and helium, and mixtures of argon, carbon dioxide and oxygen. Gas mixtures which contain carbon dioxide are particularly prone to stratification due to the higher relative weight of carbon dioxide to that of most other gases. Similarly gas mixtures which contain hydrogen or helium are also particularly prone to stratification due to the lower relative weight of hydrogen and helium to that of other gases. Furthermore gases which are classified as liquified compressed gases are prone to stratification at temperatures below their dew point.

The Figure illustrates one preferred embodiment of the invention. Referring now to the Figure, cylinder 1 comprises cylinder shell 11 which, in the embodiment illustrated in the Figure has a generally cylindrical shape. Any other effective shape, such as a sphere or horizontally oriented tank of circular or non-circular cross-section, may also be employed for the cylinder shell. The cylinder shell is made out of any effective material such as steel.

The cylinder of this invention also includes valve means through which gas is passed into and out of the cylinder shell interior, i.e. the space within the cylinder shell. Those skilled in the art are familiar with the valves which are conventionally used with gas cylinder operation. Among such valve types one can name pressure sealed, diaphragm, and regulated pressure sealed valves. In the embodiment illustrated in the Figure, cylinder shell 11 forms a narrowed or neck portion 12 and valve 2 is positioned within this neck portion. Typically the valve is threaded into position on the cylinder shell.

Tube 3 is positioned within cylinder shell 11 and in flow communication at 7 with valve 2. Tube 3 extends through the majority of the length of the cylinder shell which runs from neck portion 12 to cylinder bottomwall 13. By "length" it is meant one of the axes of the cylinder shell, preferably its vertical axis when the cylinder is oriented in its conventional position The length is generally but not necessarily the longest axis of the cylinder shell. By "majority" it is meant at least 50 percent, generally within the range of from 50 to 99 percent, and preferably within the range of from 50 to 95 percent. Tube 3 is also in flow communication with the cylinder shell interior 14 at a point remote from where it is in flow communicate with the valve means 2. Preferably this point of flow communication with the cylinder shell interior is at the end of the tube such as at end 6. Perferably, as shown in the Figure, tube 3 is cut at an angle at end 6 so as to prevent flow restriction in case of contact with bottomwall 13. Such angle is generally within the range of from 30 to 60 degrees and typically is about 45 degrees.

Tube 3 may have any effective shape. Generally and preferably tube 3 will have a circular horizontal cross-section when in the vertical position such as is illustrated in the Figure. That is, tube 3 is preferably circular piping. Generally the tube will have an inside diameter within the range of from 0.25 to 0.40 inch. The walls of tube 3 may have any effective thickness and typically this thickness is within the range of from 0.062 to 0.125 inch. Tube 3 may be constructed of any effective material such as any grade of low carbon steel tubing.

Near the point of communication with the valve means the tube has at least one perforation therethrough enabling further flow communication between the cylinder shell interior and the tube. In the embodiment illustrated in the Figure, tube 3 has one such perforation 4 which has a circular shape. Circular perforations are preferred; however the perforations may have any effective shape. The perforations may be, for example, slits, rectangles, squares, ellipses, and any combination. It has been found that generally one perforation is adequate for the effective practice of this invention. However any desired number of perforations can be employed with the proviso that a large number of perforations could weaken the structural integrity of the tube.

The Figure illustrates a particularly preferred embodiment of the invention wherein the tube contains one or more additional perforations intermediate the point where perforation(s) 4 are positioned and the point where tube 3 communicates with cylinder shell interior 14 remote from valve 2. Preferably intermediate perforation(s) 5 are at the midpoint of the length of tube 3 and are similar in shape to perforations(s) 4. As illustrated in the Figure, perforation 5 is preferably oriented on tube 3 offset by at least 90 degrees from the orientation of perforation 4 and most preferably is offset by about 90 degrees from the orientation of perforation 4.

A gas mixture is charged employing the charging method of this invention as follows. The first gas of the gas mixture is passed through valve 2 and tube 3 and passes from tube 3 into the cylinder interior at a point remote from valve 2 such as at end 6. Gas already within the cylinder interior, such as residual gas from a previous use, is drawn into tube 3 through perforations 4 by the pressure difference caused by the gas flowing within the tube. Thus the first gas of the gas mixture becomes mixed with this interior gas. This combined flow passes through tube 3 and quickly contacts bottomwall 13 owing to the length of tube 3. This contact increases the turbulence of the gas and further mixes the flowing gas with the interior gas. The charging can continue in this way until the first component of the gas mixture is fully charged.

After the charging of the first component, a subsequent component of the gas mixture is charged in substantially the same way as described above. In this case the interior gas is largely comprised of the already charged first component.

Should the gas mixture have three or more components the charging continues sequentially for each such component. The cylinder may be charged to any pressure consistent with the capabilities of the cylinder. Generally a fully charged cylinder will have a pressure of at least about 1500 pounds per square inch absolute (psia) and may have a pressure up to about 5000 psia or more. Because of the drawing into tube 3 of the interior gas or gases through perforation(s) 4, and the enhanced turbulence caused by the discharge into the cylinder interior through tube 3 remote from this drawing, the gas mixture is fully mixed within the cylinder and resists stratification which might result if each gas component were sequentially charged into the cylinder interior directly through valve 2.

In a particularly preferred charging method, additional interior gas or gases are drawn into tube 3 through intermediate perforation(s) 5. This further enhances the mixing action and thus the consistency of the gas mixture within the cylinder.

A gas mixture is delivered employing the delivery method of this invention as follows. A gas mixture within cylinder shell interior 14 is passed into tube 3 remote from valve 2, such as at end 6, and passed through tube 3. As this gas passes through tube 3 it causes gas within cylinder shell interior 14 to be drawn into tube 3 through perforation(s) 4. Thus, in the event the gas mixture within the cylinder has stratified, the gas mixture undergoes thorough re-mixing prior to passing to valve 2. Furthermore, in the event tube 3 contains a richer concentration of the last to be charged component, the mixing caused by the drawing through perforation(s) 4 rectifies this misproportion almost immediately. The gas mixture is then passed from tube 3 to valve 2 and then out to a use point such as to a welding operation. The delivery can continue in this manner, either continuously or intermittently, until the desired amount of gas mixture is delivered.

In a particularly preferred delivery method, additional interior gas mixture is drawn into tube 3 through intermediate perforation(s) 5. This further enhances the mixing action and thus the consistency of the gas mixture delivered from the cylinder.

Although the charging method and the delivery method of this invention were both described in detail with reference to gas mixtures, it is readily seen that the charging method and delivery method of this invention may both be employed with single-component gases. Moreover, while the charging method of this invention was described in detail with a gas mixture wherein each component was sequentially charged, it is readily seen that the charging method of this invention may also be carried out with a gas mixture containing two or more components being charged, i.e. with two or more components being simultaneously charged.

The following Example and Comparative Example serve to further illustrate the invention or demonstrate the advantages attainable thereby. No limitations on the invention are intended.

EXAMPLE

A cylinder as described and claimed in U.S. Pat. No. 4,461,657—Rana et al and U.S. Pat. No. 4,578,113—Rana et al, known in the art as an HC-500 ™ cylinder, having a generally cylindrical shape, a length from the neck to the bottomwall of about 51 inches, and a cylinder shell interior volume of 1.61 cubic feet, was modified by threading a tube into the valve so that the tube extended for about 95 percent through the cylinder length and communicated with the cylinder shell interior at the end opposite from where it was threaded into the valve. The tube had a circular cross-section having an inside diameter of 0.33 inch, and was made of 0.088 inch thick steel. The tube had four circular perforations of $\frac{1}{8}$ inch diameter, each at 90 degrees around the tube $\frac{1}{4}$ inch from the connection to the valve.

A gas mixture comprising 8 percent carbon dioxide and 92 percent argon was charged into the cylinder and delivered from the cylinder as follows. First the requisite amount of carbon dioxide was passed into the cylinder shell interior through the tube. Thereafter the requisite amount of argon was passed into the cylinder. The drawing action through the perforations and the turbulence enhancing length of the tube caused the gas mixture to be well mixed. The cylinder was pressurized to 4500 psia. The gas mixture was withdrawn at a flowrate of 30 standard cubic feet per hour through the tube, and interior gas, drawn into the tube through the perforations, served to rectify the concentration misbalance caused by the gas within the tube being richer in argon than the gas mixture specification called for. The withdrawn gas mixture was passed to a gas analyzer to determine the length of time it took for the withdrawn gas stream to reach the proper gas mixture of 8 percent carbon dioxide and 92 percent argon. The desired gas mixture was achieved instantaneously, i.e. in less than one second.

The procedure described above was repeated except that the tube had only one $\frac{1}{8}$ inch diameter perforation rather than the four used previously, $\frac{1}{4}$ inch from the valve connection. The desired gas mixture was again achieved instantaneously.

COMPARATIVE EXAMPLE

For comparative purposes, the cylinder and procedure described in the Example was repeated except that the tube had no perforations; thus the gas passed through the entire length of the tube without having interior gas drawn into its flow. In this Comparative Example, about two minutes was required for the withdrawn gas to achieve the desired gas mixture proportions.

Now by the use of the cylinder, charging method, and delivery method of this invention, one can provide a gas mixture of better consistency, and thus improved cylinder operation efficiency, than is available with heretofore available methods.

Although the invention has been described in detail with reference to certain embodiments, it will be appreciated by these skilled in the art that there are other embodiments of the invention within the spirit and scope of the claims.

We claim:

1. A method for delivering gas from a cylinder comprising:
   (A) providing a cylinder having a cylinder shell, valve means through which gas may be passed into or out of the cylinder shell, and a tube extending through the majority of the length of the cylinder shell in flow communication with said valve means and with the cylinder shell interior, said tube having at least one perforation in the tube wall each said perforation being near the point of communication with said valve means and having no other perforation along the length of the tube, said perforation(s) enabling further flow communication between the cylinder shell interior and the tube;

(B) passing gas from the cylinder interior into and through the tube;

(C) drawing gas from the cylinder interior into the tube through said perforation(s); and (D) delivering the gas passed into the tube in step (B) and drawn into the tube in step (C) out from the cylinder.

2. The method of claim 1 wherein the gas is a single component gas.

3. The method of claim 1 wherein the gas comprises carbon dioxide.

4. The method of claim 1 wherein the gas comprises hydrogen.

5. The method of claim 1 wherein the gas comprises helium.

6. The method of claim 1 wherein the gas is a mixture of two or more components.

7. The method of claim 6 wherein the gas mixture comprises argon and carbon dioxide.

8. The method of claim 6 wherein the gas mixture comprises argon, carbon dioxide and helium.

9. The method of claim 6 wherein the gas mixture comprises argon, carbon dioxide and oxygen.

* * * * *